United States Patent
Challener et al.

(10) Patent No.: US 6,591,297 B1
(45) Date of Patent: Jul. 8, 2003

(54) DATA PROCESSING SYSTEM AND METHOD FOR PROVIDING A NETWORKED PRINTER'S PHYSICAL LOCATION

(75) Inventors: David Carroll Challener, Raleigh, NC (US); Joseph P. McGovern, Apex, NC (US); Frank P. Novak, Raleigh, NC (US); Hernando Ovies, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/514,797

(22) Filed: Feb. 28, 2000

(51) Int. Cl.[7] ............................................. G06F 13/00
(52) U.S. Cl. ...................... 709/224; 709/200; 709/203; 709/217; 709/218; 709/219; 709/223; 358/1.15; 358/1.14
(58) Field of Search ............................. 358/1.15, 1.14, 358/296; 709/201, 200, 203, 217, 218, 219, 223, 224; 359/159

(56) References Cited

U.S. PATENT DOCUMENTS

| 5,434,775 A | | 7/1995 | Sims et al. ................. 364/403 |
|---|---|---|---|
| 5,727,135 A | | 3/1998 | Webb et al. ................. 395/113 |
| 5,745,682 A | * | 4/1998 | Keenan ....................... 709/220 |
| 5,754,767 A | * | 5/1998 | Ruiz ........................... 709/220 |
| 5,828,864 A | | 10/1998 | Danknick et al. ........... 395/500 |
| 5,873,659 A | | 2/1999 | Edwards et al. ............. 400/61 |
| 5,905,906 A | | 5/1999 | Goffinet et al. ............. 395/828 |
| 6,244,762 B1 | * | 6/2001 | Fukano et al. ................ 400/70 |
| 6,359,711 B1 | * | 3/2002 | Cole et al. .................. 359/118 |
| 6,397,249 B1 | * | 5/2002 | Cromer et al. .............. 709/224 |
| 6,452,692 B1 | * | 9/2002 | Yacoub ..................... 358/1.15 |
| 6,504,825 B1 | * | 1/2003 | Atkins et al. ............... 370/254 |

* cited by examiner

*Primary Examiner*—Moustafa M. Meky
*Assistant Examiner*—Sahera Halim
(74) *Attorney, Agent, or Firm*—Bracewell & Patterson, LLP

(57) ABSTRACT

A data processing system and method are described for providing a networked printer's physical location. The printer, a server computer system, and client computer systems are coupled together utilizing a network. The server computer system first transmits a command to the printer to disable the print function of the printer. Entry of a physical location of the printer is then permitted. The print function of the printer is reenabled by the server computer system only in response to an entry of the physical location of the printer into the printer.

14 Claims, 4 Drawing Sheets

DATA PROCESSING SYSTEM AND METHOD FOR PROVIDING A NETWORKED PRINTER'S PHYSICAL LOCATION

BACKGROUND OF THE INVENTION

1. Field of the Invention

The present invention relates in general to data processing systems and, in particular, to a data processing system and method including a server and client computer systems and a printer coupled together utilizing a network. Still more particularly, the present invention relates to a data processing system and method including a server and client computer systems and a printer coupled together utilizing a network for providing a physical location for the network printer.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

It is often difficult for a user to physically locate a nearest printer which is coupled to a network. Further, after a user locates a particular networked printer to use, there is no indication that the printer is operational, or provides the functionality required by the user, e.g. the ability to print in color.

One method for solving this problem is to maintain a paper record of the physical locations for each networked printer. This record is manually updated by having a system administrator walk around to physically locate each networked printer. However, printers are easily and typically moved. Therefore, the record quickly becomes outdated and incorrect.

Therefore a need exists for a data processing system and method for providing a physical location of a network printer.

SUMMARY OF THE INVENTION

A data processing system and method are described for providing a networked printer's physical location. The printer, a server computer system, and client computer systems are coupled together utilizing a network. The server computer system first transmits a command to the printer to disable the print function of the printer. Entry of a physical location of the printer is then permitted. The print function of the printer is reenabled by the server computer system only in response to an entry of the physical location of the printer into the printer.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–4 of the drawings, like numerals being used for like and corresponding parts of the accompanying drawings.

The present invention is a method and system for providing a physical location of a networked printer. The printer includes a memory into which may be stored the printer's physical location. The printer also includes an entry pad for permitting a user to enter the physical location into the printer.

When the physical location of the printer is to be determined, such as when the printer is initially coupled to the network, the server transmits a command to the printer via the network which causes the printer to print out instructions regarding how a user is to enter the physical location of the printer. Thereafter, the server transmits a command to the printer via the network causing the printer to disable its print functionality. Therefore, the printer is capable of sending and receiving network traffic, but is unable to print.

A user must then enter a physical location into the printer utilizing the entry pad. The printer then enables its print function and either transmits its physical location to the server or holds the physical location in the printer's storage.

Once the server receives the printer location, either the server or a system administrator may then determine whether the printer location is a correct location. If a user has either intentionally or unintentionally entered an incorrect printer location, the server may be utilized to transmit a warning to the printer which the printer will then print.

The printer's physical location may then be added to a database of network printer locations. In this manner, the database may be easily updated as frequently as necessary.

Figure 1:
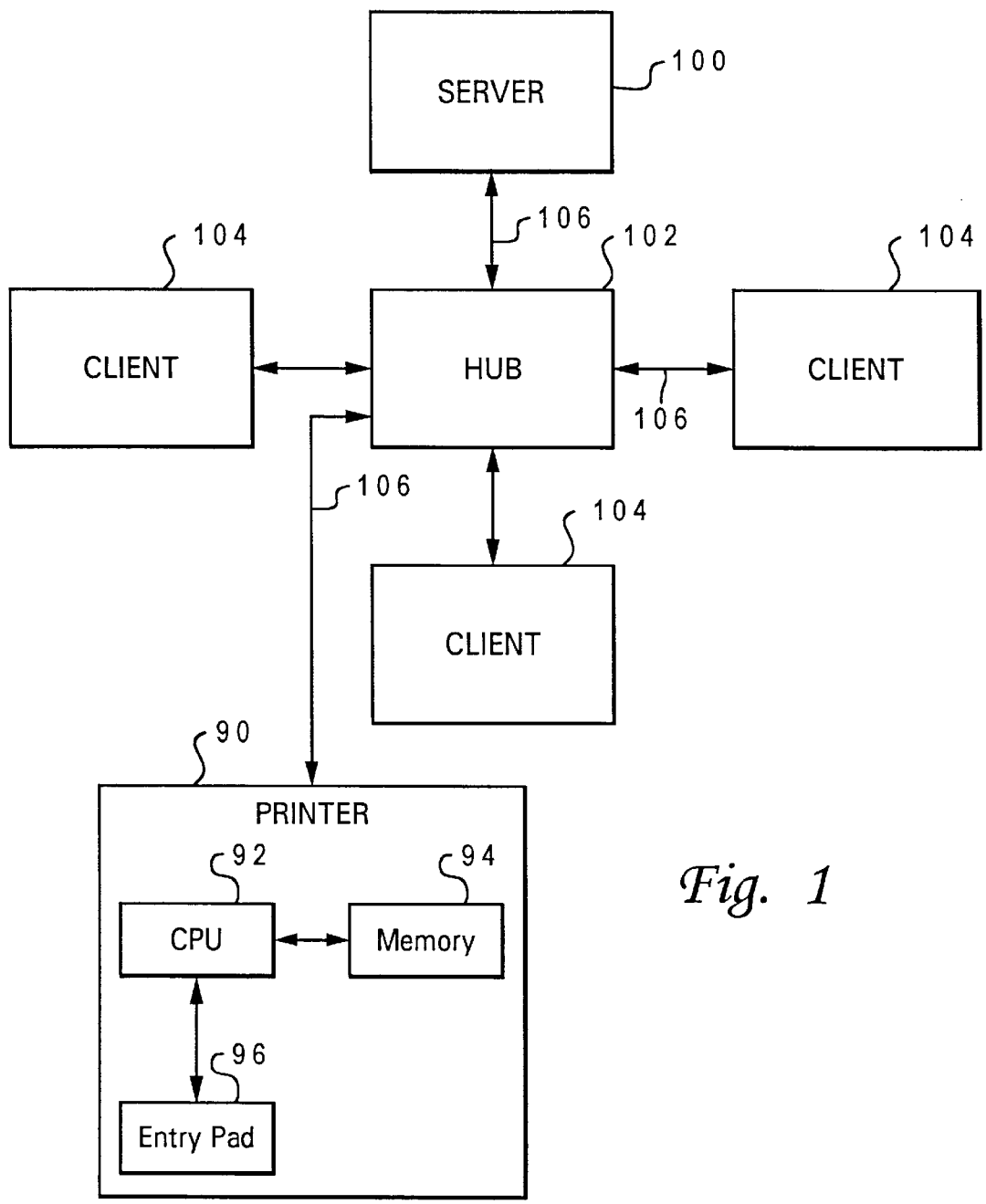
FIG. 1 illustrates a pictorial representation of a data processing system including a printer, a plurality of client computer systems and a server computer system coupled together utilizing a network and a hub in accordance with the method and system of the present invention.

FIG. 1 illustrates a pictorial representation of a data processing system including a networked printer 90 and a plurality of client computer systems 104 coupled to a server computer system 100 utilizing a hub 102 to form a network in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks, such as token ring, may be utilized to implement the invention.

A "network" may include any type of data communications channel, such as an Ethernet network, token ring, X.10, or X.25. Those skilled in the art will recognize that the invention described herein may be implemented utilizing any type of data communications channel. However, the preferred embodiment is implemented utilizing an Ethernet network.

Printer 90 includes a CPU 92, a memory 94, and an entry pad 96. Entry pad 96 may be utilized to permit a user to enter the physical location of printer 90. Once entered, this physical location may be stored in memory 94.

Figure 2:
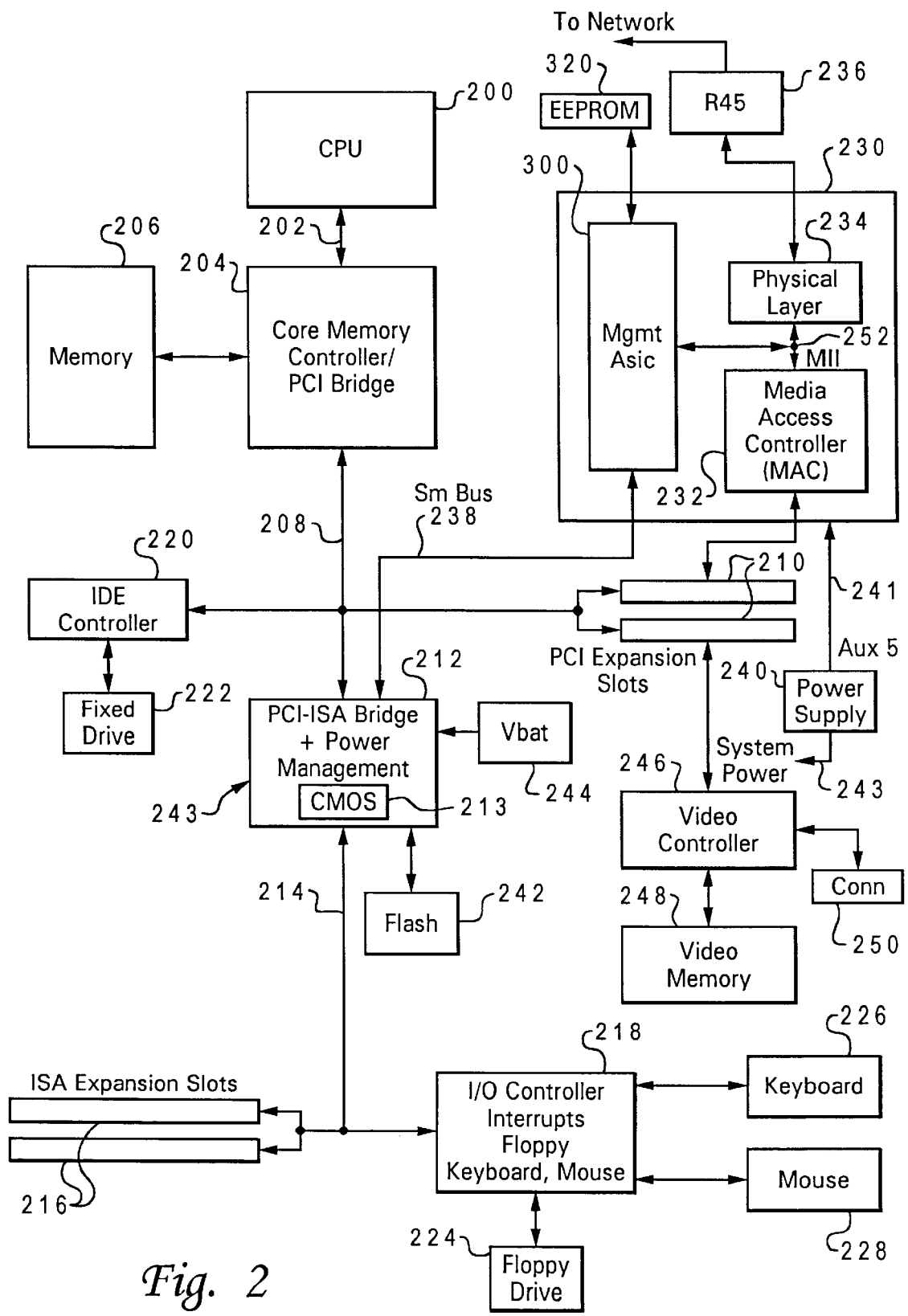
FIG. 2 depicts a more detailed pictorial representation of a computer system of FIG. 1 in accordance with the method and system of the present invention.

FIG. 2 illustrates a more detailed representation of either a client or server computer system of FIG. 1 in accordance with the method and system of the present invention. Client computer system 104 includes a planar (also commonly called a motherboard or system board) which is mounted within client 104 and provides a means for mounting and electrically interconnecting various components of client 104 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 204 are connected to PCI bus bridge 204 utilizing PCI bus 208. IDE controller 220 provides for the attachment of IDE compatible storage devices, such as removable hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not necessary in order to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Client computer system 104 includes a video controller 246 which may, for example, be plugged into one of PCI expansion slots 210. Video controller 246 is connected to video memory 248. The image in video memory 248 is read by controller 246 and displayed on a monitor (not shown) which is connected to computer system 104 through connector 250.

Computer system 104 includes a power supply 240 which supplies full normal system power 243, and has an auxiliary power main AUX 5 241 which supplies full time power to the power management logic 212.

Client 104 also includes a network adapter 230.

Network adapter 230 includes a physical layer 234 and a media access controller (MAC) 232 coupled together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234. Network adapter 230 may be plugged into one of the PCI connector slots 210 (as illustrated) or one of the ISA connector slots 216 in order to permit client 104 to communicate with server 100 utilizing a communication link 106.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mbps CSMA/CD Ethernet applications. Physical layer 234 receives parallel data from the MII local bus 252 and converts it to serial data for transmission through connector 236. Physical layer 234 is also responsible for wave shaping and provides analog voltages. In a preferred embodiment, physical layer 234 is implemented utilizing an Integrated Services chip ICS-1890.

Physical layer 234 includes auto-negotiation logic that serves three primary purposes. First, it determines the capabilities of client 104. Second, it advertises its own capabilities to server 100. And, third, it establishes a connection with server 100 using the highest performance connection technology.

Figure 3:
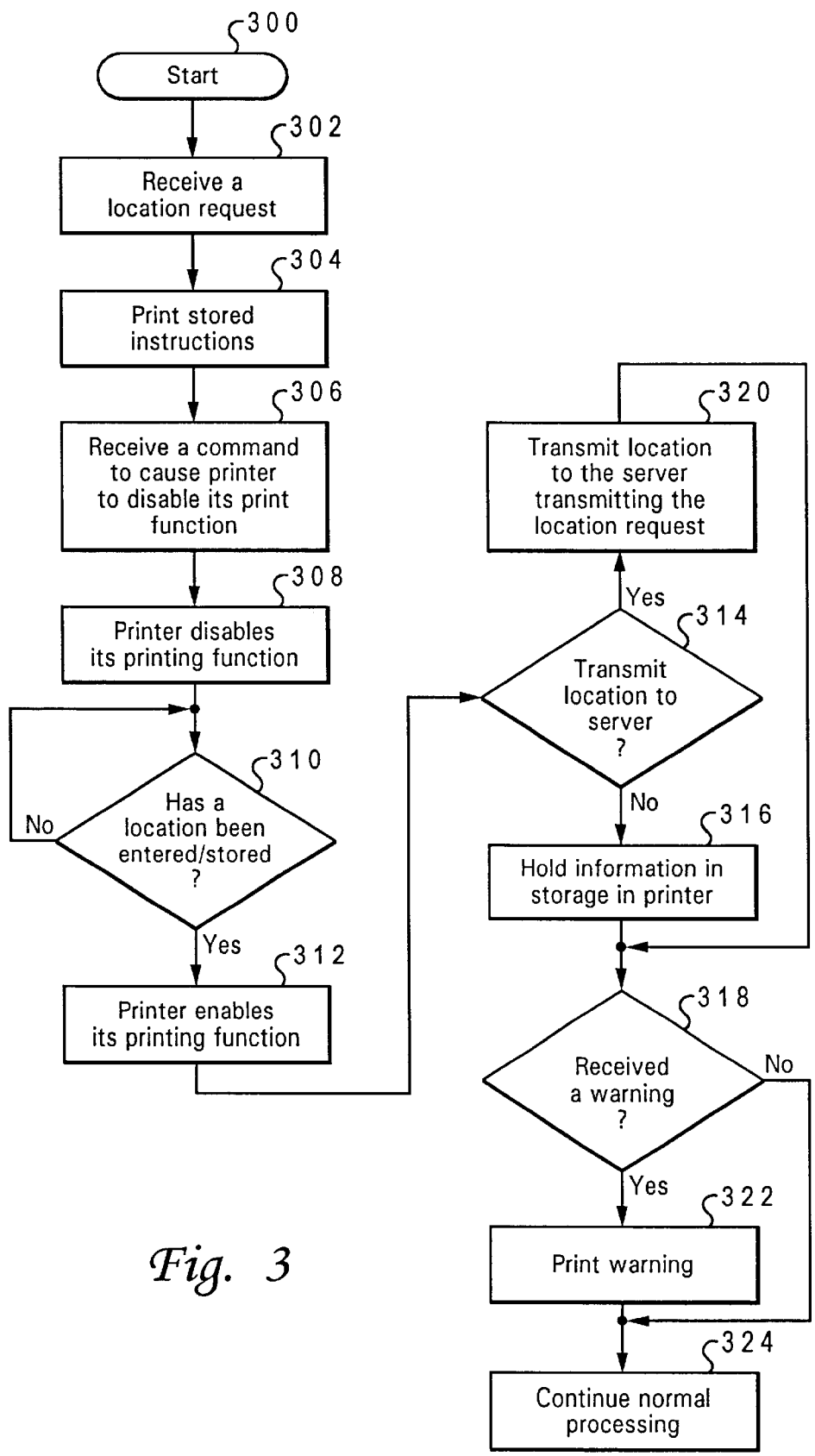
FIG. 3 illustrates a high level flow chart which depicts a printer maintaining a disabled print function until a physical location is entered into the printer in accordance with the method and system of the present invention.

FIG. 3 illustrates a high level flow chart which depicts a network printer maintaining a disabled print function until a physical location is entered into the printer in accordance with the method and system of the present invention. The process starts as depicted at 300 and thereafter passes to block 302 which illustrates a network printer receiving a location request via the network from a server computer system. In response to a receipt of the request, block 304 depicts the printer printing instructions explaining how to enter the printer's physical location. Next, block 306 illustrates the printer receiving a command via the network to disable its print function.

When the printer receives the command, the printer disables its print function as depicted in block 308. Next, block 310 illustrates a determination by the printer of whether or not a physical location has been entered into and stored within the printer. If a determination is made that a location has not been entered and stored, the process passes back to block 310 until a location is entered and stored. Referring again to block 310, if a determination is made that a location has been entered and stored, the process passes to block 312 which depicts the printer enabling its print function. Therefore, after the printer receives a location request over the network, the printer will not print until a location is entered and stored within the printer.

The process then passes to block 314 which illustrates a determination of whether or not the printer is to transmit its location to the server. If a determination is made that the printer is not to transmit its location to the server, the process passes to block 316 which depicts the printer holding the entered location in its memory. The process then passes to block 318.

Referring again to block 314, if a determination is made that the printer is to automatically transmit its location to the server, the process passes to block 320 which depicts the printer transmitting the physical location stored in its memory to the server computer system which originally transmitted the location request. The process then passes to block 318.

Block 318, then, illustrates a determination of whether or not the printer has received a warning. If a determination is made that the printer has not received a warning, the process passes to block 324. Referring again to block 318, if a determination is made that the printer has received a warning, the printer will print the warning as depicted by block 322. The process then passes to block 324 which illustrates the continuation of normal processing.

Figure 4:
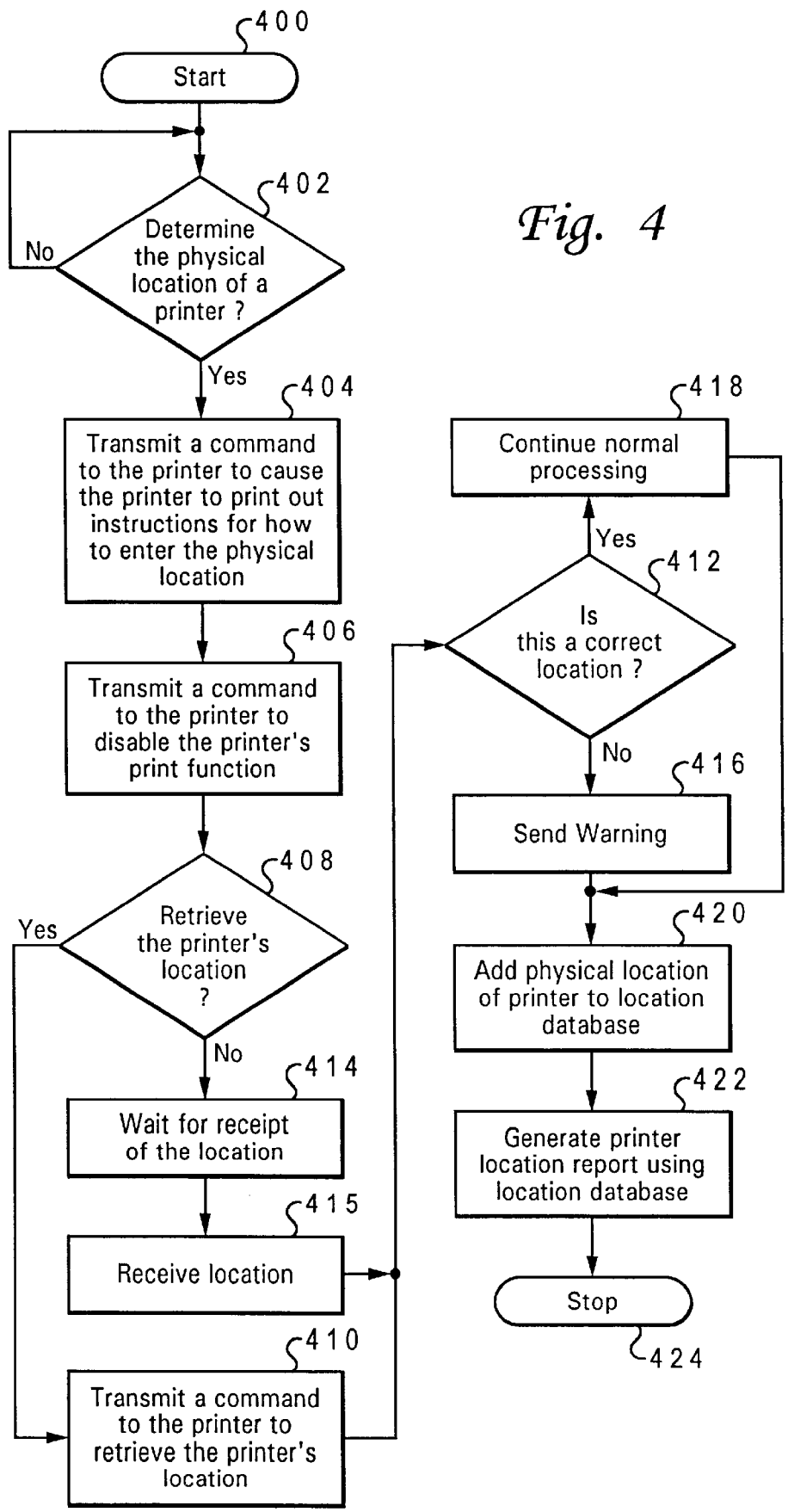
FIG. 4 depicts a high level flow chart which illustrates a server computer system transmitting a command which disables a printer's print function until the printer receives the printer's physical location in accordance with the method and system of the present invention.

FIG. 4 depicts a high level flow chart which illustrates a server computer system transmitting a command which disables a printer's print function until the printer receives the printer's physical location in accordance with the method and system of the present invention. The process starts as depicted by block 400 and thereafter passes to block 402 which illustrates a determination of whether or not the server computer system needs to determine the physical location of a printer coupled to the network. If a determination is made that the server computer system does not need to determine the physical location of a network printer, the process passes back to block 402. Referring again to block 402, if a determination is made that the server computer system does need to determine the physical location of a network printer, the process passes to block 404 which depicts the server transmitting a command to the network printer to cause the printer to print out instructions about how to enter the printer's physical location. Next, block 406 illustrates the server transmitting a command to the printer to cause the printer to disable its printing function.

The process then passes to block 408 which depicts a determination of whether or not the server computer system is to retrieve the printer's location. If a determination is made that the server is to retrieve the printer's physical location, the process passes to block 410 which illustrates the server transmitting a command to the printer to retrieve the printer's location. The process passes to block 412.

Referring again to block 408, if a determination is made that the server is not to retrieve the printer's physical location, the process passes to block 414 which illustrates the server waiting for the receipt of the physical location. Next, block 415 depicts the receipt of the physical location entered into the printer. The process then passes to block 412.

Block 412, then, illustrates a determination of whether or not a determination was made that the received physical location is a correct location. Either the server computer system receiving this physical location or a user may make the determination. The server may make the determination by parsing the receiving location information and determining whether the location is valid. For example, a server must determine whether a room number, building number, or other data was entered. If instead of entering a physical location the user pressed an ENTER key multiple times, the server will determine that a valid location was not entered. If a determination is made that the location is not a correct location, the process passes to block 416 which depicts the server sending a warning to the printer that the entered physical location is incorrect. The process then passes to block 420.

Referring again to block 412, if a determination is made that the location is a correct location, the process passes to block 418 which depicts the continuation of normal processing by the server. The process then passes to block 420.

Block 420, then, illustrates the addition of the physical location received from the printer to a location database which maintains physical location information for printers coupled to the network. Next, block 422 depicts the generation of a printer location report using the location database. The process then terminates as illustrated at block 424.

While a preferred embodiment has been particularly shown and described, it will be understood by those skilled in the art that various changes in form and detail may be made therein without departing from the spirit and scope of the present invention.

What is claimed is:

1. A method for providing a physical location of a printer to a server computer system, wherein said printer is coupled to a network having said server computer system, said method:
   in response to a request for a physical location of said printer from said server computer system, disabling a print function of said printer;
   pending an entry of a physical location of said printer from a user;
   reenabling said print function of said printer only in response to an entry of a physical location of said printer into said printer from a user; and
   transmitting said physical location of said printer to said server computer system via said network.

2. The method according to claim 1, further comprising transmitting a command to said printer from said server computer system via said network to disable said print function of said printer.

3. The method according to claim 1, further comprising printing instructions from said printer to instruct a user how to enter an entry of a physical location of said printer, in response to said request for a physical location of said printer.

4. The method according to claim 1, further comprising transmitting a warning from said server computer system via said network to said printer in response to a determination by said server computer system that said physical location received from said printer is incorrect.

5. The method according to claim 4, further comprising printing said warning by said printer.

6. The method according to claim 1, further comprising:
   establishing a database of printer locations for printers coupled to said network; and
   adding said printer location of said printer to said database in response to a receipt of said printer location by said server computer system.

7. The method according to claim 1, further comprising storing said printer location in a memory included within said printer.

8. An apparatus capable of providing a physical location of a printer to a server computer system, wherein said printer is coupled to a network having said server computer system, said apparatus comprising:

in response to a request for a physical location of said printer from said server computer system, means for disabling a print function of said printer;

an entry pad for permitting an entry of a physical location of said printer from a user;

means for reenabling said print function of said printer only in response to an entry of a physical location of said printer into said printer from a user; and means for transmitting said physical location of said printer to said server computer system via said network.

9. The apparatus according to claim 8, further comprising means for transmitting a command from said server computer system to said printer via said network to disable said print function of said printer.

10. The apparatus according to claim 8, further comprising means for printing instructions from said printer to instruct a user how to enter an entry of a physical location of said printer, in response to said request for a physical location of said printer.

11. The apparatus according to claim 8, further comprising means for transmitting a warning from said server computer system via said network to said printer in response to a determination by said server computer system that said physical location received from said printer is incorrect.

12. The apparatus according to claim 11, further comprising means for printing said warning.

13. The apparatus according to claim 8, further comprising:

a database for storing printer locations for printers coupled to said network; and means for adding said printer location of said printer to said database in response to a receipt of said printer location by said server computer system.

14. The apparatus according to claim 8, further comprising a memory included within said printer, for storing said physical location.

* * * * *